(12) United States Patent
Yabu et al.

(10) Patent No.: US 8,946,581 B2
(45) Date of Patent: Feb. 3, 2015

(54) SWITCHGEAR

(71) Applicant: Hitachi, Ltd., Chiyoda-ku, Tokyo (JP)

(72) Inventors: Masato Yabu, Hitachi (JP); Kenji Tsuchiya, Hitachi (JP); Ayumu Morita, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 185 days.

(21) Appl. No.: 13/766,104

(22) Filed: Feb. 13, 2013

(65) Prior Publication Data

US 2013/0240485 A1    Sep. 19, 2013

(30) Foreign Application Priority Data

Mar. 14, 2012 (JP) ................................. 2012-056892

(51) Int. Cl.
| | |
|---|---|
| *H01H 33/66* | (2006.01) |
| *H01H 33/662* | (2006.01) |
| *H02B 13/035* | (2006.01) |
| *H02B 13/075* | (2006.01) |
| *H02B 13/01* | (2006.01) |

(52) U.S. Cl.
CPC ..... *H01H 33/66207* (2013.01); *H02B 13/0354* (2013.01); *H02B 13/075* (2013.01); *H02B 13/01* (2013.01)
USPC ........................... 218/119; 361/116; 361/752

(58) Field of Classification Search
USPC ........................... 218/119; 361/108–116, 752
See application file for complete search history.

(56) References Cited

U.S. PATENT DOCUMENTS

| | | | | |
|---|---|---|---|---|
| 2,218,554 | A | * | 10/1940 | Rossman ....................... 361/608 |
| 3,657,679 | A | * | 4/1972 | Wilson ........................... 337/244 |
| 7,193,172 | B2 | * | 3/2007 | Rokunohe et al. .............. 218/43 |
| 2003/0174487 | A1 | * | 9/2003 | Garmong ....................... 361/816 |
| 2005/0056617 | A1 | * | 3/2005 | Rokunohe et al. ................ 218/7 |
| 2007/0002547 | A1 | * | 1/2007 | Garmong ....................... 361/752 |
| 2007/0228014 | A1 | | 10/2007 | Tsuchiya et al. |
| 2009/0020507 | A1 | * | 1/2009 | Kurogi et al. .................. 218/119 |
| 2011/0299228 | A1 | * | 12/2011 | Milovac et al. ............... 361/614 |

FOREIGN PATENT DOCUMENTS

| | | |
|---|---|---|
| CN | 202159922 U | 3/2012 |
| EP | 2 073 330 A2 | 6/2009 |

(Continued)

OTHER PUBLICATIONS

Extended European Search Report dated Jul. 15, 2013 (7 pages).

*Primary Examiner* — Truc Nguyen
(74) *Attorney, Agent, or Firm* — Crowell & Moring LLP (57) ABSTRACT

The switchgear includes a vacuum circuit breaker that is disposed in a circuit breaker chamber compartmented by a grounded metal plate, a busbar that is disposed in a busbar chamber and connected to the vacuum circuit breaker through a conductor, a cable that is disposed in a cable chamber and connected at one end to a load side, and a grounding device that is operated by a grounding device actuator disposed in a grounding device actuator chamber, connected to the vacuum circuit breaker through a conductor, and connected to the other end of the cable. The busbar is formed by a solid-insulated busbar. The conductor connecting the vacuum circuit breaker to the busbar and the conductor connecting the vacuum circuit breaker to the grounding device are both formed by a solid-insulated conductor. The circuit breaker chamber and the grounding device have a sealed structure.

15 Claims, 4 Drawing Sheets

(56) References Cited

FOREIGN PATENT DOCUMENTS

| | | |
|---|---|---|
| EP | 2 296 160 A1 | 3/2011 |
| GB | 2 338 600 A | 12/1999 |
| JP | 2004-320854 A | 11/2004 |
| JP | 2004-336891 A | 11/2004 |
| JP | 2006-067721 A | 3/2006 |
| JP | 2006-238522 A | 9/2006 |

* cited by examiner

SWITCHGEAR

TECHNICAL FIELD

The present invention relates to switchgear, and more particularly to switchgear suitable for use, for instance, with a power-receiving substation.

CLAIM OF PRIORITY

The present application claims priority from Japanese Patent application serial No. 2012-56892, filed on Mar. 14, 2012, the content of which is hereby incorporated by reference into this application.

Background Art

A power-receiving substation is equipped with switchgear (metal clad switchgear) housing a vacuum circuit breaker for interrupting a load current or a fault current, a disconnecting switch and a grounding switch for worker safety assurance during load maintenance and inspection, detection devices for detecting a system voltage and a system current, a protective relay and so forth.

The switchgear is insulated by using a variety of insulation methods. Air-insulated switchgear and a cubicle-type gas-insulated switchgear (GIS) based on SF6 gas have been conventionally used. In recent years, solid-insulated switchgear, compressed-air-insulated switchgear, and fully-vacuum-insulated switchgear have also been brought into use in consideration of environmental friendliness. Due to the use of various insulation methods, the components of a circuit breaker, a disconnecting switch, and a grounding switch are increasingly downsized.

Under the above circumstances, vacuum-insulated switchgear described, for instance, in Japanese Patent Laid-open No. 2006-238522 (PTL 1) houses an epoxy cast integrated assembly of a switch section and a grounding switch section. The switch section includes a vacuum-insulated, double-break, three-position switch having an interrupting function and a disconnecting function. The grounding switch section includes a vacuum-insulated grounding switch.

The above vacuum-insulated switchgear is configured so that its housing contains an epoxy cast integrated assembly of a vacuum case housing a vacuum-insulated, double-break, three-position switch having an interrupting function and a disconnecting function and a vacuum case housing a switch having a grounding function. As the above vacuum-insulated switchgear is compact, lightweight, and highly reliable, it meets the need for compact, lightweight switchgear for use, for instance, in urban distribution facilities.

CITATION LIST

Patent Literature

[PTL 1] Japanese Patent Laid-open No. 2006-238522

SUMMARY OF INVENTION

Technical Problem

In recent years, user demands for power-receiving substations are diversified. For example, the type of load and operating conditions vary with the purpose of use of a power-receiving substation. Hence, a distribution system is planned in consideration of demanded safety, reliability, and operation maintainability and of future load increase. However, the distribution system should also be planned in consideration of control of a circuit breaker, disconnecting switch, grounding switch, and other equipment forming the power-receiving substation, and monitoring and measurement of voltage, current, electrical power, and other similar parameters of the power-receiving substation.

In the above instance, it is important that the investment for installing the circuit breaker, disconnecting switch, grounding switch, and other equipment, control equipment for such equipment, and monitoring/measurement equipment be reduced by minimizing the space required for installing the above-mentioned equipments.

Further, the air is thin at a high altitude. This results in poor convective heat dissipation. In addition, a discharge starting voltage decreases in proportion to a decrease in atmospheric pressure, thereby degrading the performance of insulation. At a high altitude (e.g., at an altitude of 1000 m to 4000 m), therefore, it is necessary to choose equipment having enhanced dielectric strength. However, such equipment is expensive and not economical.

The present invention has been made in view of the above circumstances and provides switchgear that not only exhibits reliable dielectric strength but also downsizes relevant equipment by minimizing the space required for equipment installation and reduces the investment for equipment installation.

Further, the present invention also provides switchgear that is economical because it need not be especially adapted to high altitudes even when it is to be used at a high altitude.

Solution to Problem

According to one aspect of the present invention, there is provided switchgear including a housing, a vacuum circuit breaker, a busbar, a cable, and a grounding device. The housing contains a circuit breaker chamber, a busbar chamber, a cable chamber, a grounding device actuator chamber, and a control chamber, which are partitioned by a grounded metal plate. The vacuum circuit breaker is disposed in the circuit breaker chamber. The busbar is disposed in the busbar chamber and connected to the vacuum circuit breaker through a conductor. The cable is disposed in the cable chamber and connected at one end to a load side. The grounding device is operated by a grounding device actuator disposed in the grounding device actuator chamber, connected to the vacuum circuit breaker through a conductor, and connected to the other end of the cable. The busbar is formed by a solid-insulated busbar. The conductor connecting the vacuum circuit breaker to the busbar and the conductor connecting the vacuum circuit breaker to the grounding device are both formed by a solid-insulated conductor. The circuit breaker chamber and the grounding device have a sealed structure.

According to another aspect of the present invention, there is provided switchgear including a housing, a vacuum circuit breaker, a busbar, a cable, and a grounding device. The housing contains a circuit breaker chamber, a busbar chamber, a cable chamber, a grounding device actuator chamber, and a control chamber, which are partitioned by a grounded metal plate. The vacuum circuit breaker is disposed in the circuit breaker chamber. The busbar is disposed in the busbar chamber and connected to the vacuum circuit breaker through a conductor. The cable is disposed in the cable chamber and connected at one end to a load side. The grounding device is operated by a grounding device actuator disposed in the grounding device actuator chamber, connected to the vacuum circuit breaker through a conductor, and connected to the other end of the cable. The busbar is formed by a solid-insulated busbar. The conductor connecting the vacuum circuit breaker to the busbar and the conductor connecting the vacuum circuit breaker to the grounding device are both formed by a solid-insulated conductor. At least the circuit breaker chamber and the grounding device are pressurized to a predetermined pressure.

Advantageous Effects of Invention

The present invention makes it possible to provide switchgear that not only exhibits reliable dielectric strength but also downsizes relevant equipment by minimizing the space required for equipment installation and reduces the investment for equipment installation. Further, the present invention also makes it possible to provide switchgear that is economical because it need not be especially adapted to high altitudes even when it is to be used at a high altitude.

DESCRIPTION OF EMBODIMENTS

Switchgear according to embodiments of the present invention will now be described with reference to the accompanying drawings. In the descriptions of the embodiments, like elements are designated by the same reference numerals.

EXAMPLE 1

Figure 1:
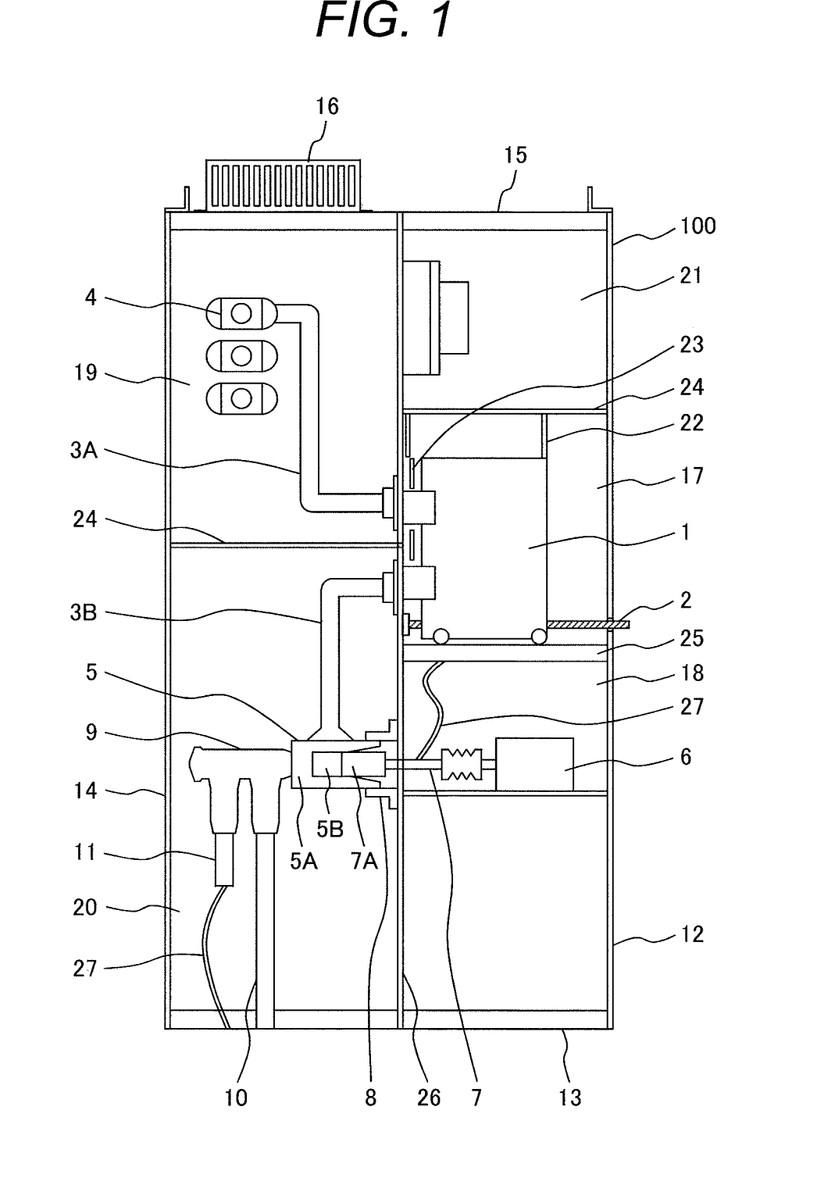
FIG. 1 is a diagram illustrating the configuration of switchgear according to a first embodiment of the present invention.

FIG. 1 shows the switchgear according to a first embodiment of the present invention. Referring to FIG. 1, a housing 100 for the switchgear according to the first embodiment is partitioned into a front portion (the right side of FIG. 1) and a rear portion (the left side of FIG. 1) by a grounded metal plate 26. The front portion is compartmented, from top to bottom, into a control chamber 21, a circuit breaker chamber 17, and a grounding device actuator chamber 18. The rear portion is compartmented, from top to bottom, into a busbar chamber 19 and a cable chamber 20. The circuit breaker chamber 17 and grounding device actuator chamber 18 in the front portion are partitioned by a support plate 25 which is also a grounded metal plate. The circuit breaker chamber 17 and the control chamber 21 in the front portion are partitioned by a partition plate 24 which is also a grounded metal plate. The busbar chamber 19 and cable chamber 20 in the rear portion are partitioned by another partition plate 24 which is also a grounded metal plate.

A vacuum circuit breaker 1 is disposed in the circuit breaker chamber 17. A solid-insulated busbar 4 having a surface ground layer, which is connected to the vacuum circuit breaker 1 through a solid-insulated conductor 3A having a surface ground layer, is disposed in the busbar chamber 19. A cable bushing 9 and a grounding device 5 are disposed in the cable chamber 20. A cable 10 connected at one end to a load side is extended from the cable bushing 9. The grounding device 5 is connected to the vacuum circuit breaker 1 through a solid-insulated conductor 3B having a surface ground layer and connected to the other end of the cable 10 through the cable bushing 9. A grounding device actuator 6 for operating the grounding device 5 is disposed in the grounding device actuator chamber 18. A protective relay, measurement equipment, and other equipment are disposed in the control chamber 21.

The vacuum circuit breaker 1 disposed in the circuit breaker chamber 17 can move over the support plate 25. The vacuum circuit breaker 1 can be inserted into a main circuit connection position (operating position) in the circuit breaker chamber 17 or extracted to a disconnected position from the operating position when a vacuum circuit breaker insertion/extraction rod 2 is rotated from the outside of the housing 100.

Further, a partition wall 22 is disposed so that, for example, workers cannot access a main circuit section in the rear of the vacuum circuit breaker 1 from a panel front surface 12. While the vacuum circuit breaker 1 is extracted from the operating position, a shutter 23 covers the main circuit section. While the vacuum circuit breaker 1 is in an operating state shown in FIG. 1, the shutter 23 opens so that the vacuum circuit breaker 1 can be inserted into the main circuit section.

In the present embodiment, the circuit breaker chamber 17 and the grounding device 5 both have a sealed structure (a shaded area of FIG. 2) and are pressurized to a predetermined pressure (e.g., to a pressure of 1 to 5 atmospheres). The circuit breaker chamber 17 and the grounding device 5 may be pressurized to the same pressure or to different pressures.

Figure 2:
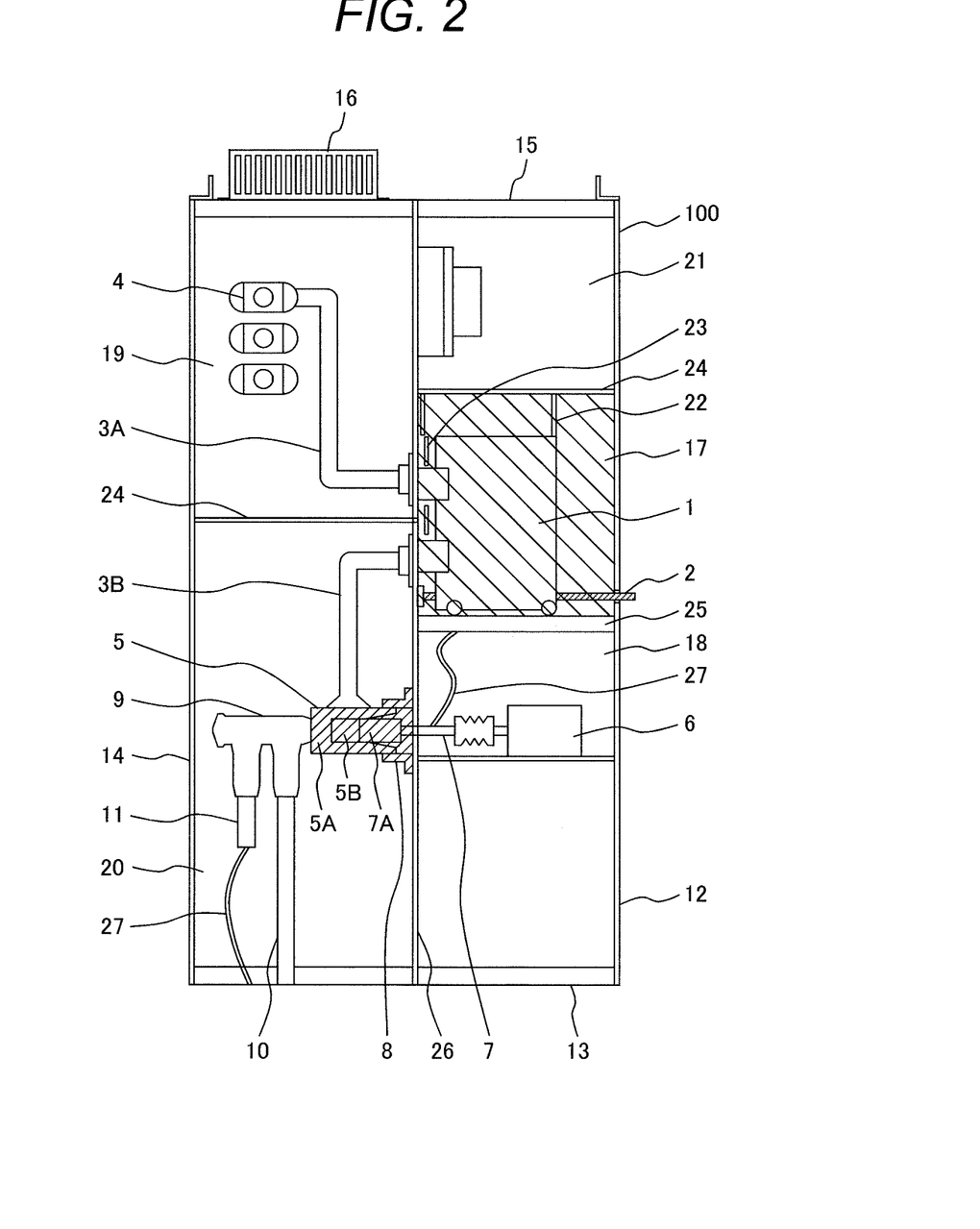
FIG. 2 is a diagram explaining sealed and/or pressurized areas in the switchgear according to the first embodiment of the present invention.

The sealed structure of the circuit breaker chamber 17 is obtained by forming a gas-tight space in the same manner as for a pressure vessel. More specifically, the sealed structure is obtained by housing necessary equipments in a box-shaped body and sealing an operating portion with a seal material (e.g., O-ring). The sealed structure of the grounding device 5 is obtained by covering the main circuit section (a portion other than the actuator and operating rod) with an insulator. In the present embodiment, the leading end of a U-shaped insulator 5A (e.g., epoxy resin) is sealed with a sealing cover 8, which is a seal material, in such a manner as to seal a void 5B that is formed when the leading end 7A of an insulator operating rod 7 extended from the grounding device actuator 6 is covered with the U-shaped insulator 5A.

On the other hand, in the conventional configuration in which the grounding device actuator chamber is disposed, the grounding device actuator chamber can usually exchange a gas with the circuit breaker chamber.

A state where the circuit breaker chamber 17 and the grounding device 5 are pressurized to a predetermined pressure is a state where the circuit breaker chamber 17 and the grounding device 5 are pressurized to a pressure of 1 to 5 atmospheres. More specifically, the circuit breaker chamber 17 and the grounding device 5 are maintained at a pressure of 1 atmosphere at a high altitude while they are not pressurized. When a high voltage is to be handled, a gas or dry air is injected into the circuit breaker chamber 17 or into the void 5B of the grounding device 5 to pressurize the circuit breaker chamber 17 and the grounding device 5 to a pressure of up to 5 atmospheres.

The reason why the circuit breaker chamber 17 and the grounding device 5 are pressurized to a pressure of 1 to 5 atmospheres is that an increase in the pressure improves the performance of insulation whereas a decrease in the pressure degrades the performance of insulation. More specifically, applying a pressure lower than the atmospheric pressure (a pressure lower than 1 atmosphere) is meaningless. In addition, applying a pressure higher than approximately 5 atmospheres makes it difficult to form a sealed portion or achieve sealing.

The reference numeral 11 denotes an arrester; the reference numeral 12, a panel front surface; the reference numeral 13, a panel bottom surface; the reference numeral 14, a panel rear surface; the reference numeral 15, a panel top surface; and the reference numeral 16, an exhaust port.

As the present embodiment employs the above-described configuration, the circuit breaker chamber 17 and the grounding device 5 have a sealed structure. This makes it possible to prevent the performance of insulation from being degraded by dust. Further, as the busbar is formed by a solid-insulated busbar 4 and the conductors are formed by solid-insulated conductors 3A, 3B, it is not necessary to perform maintenance for preventing the occurrence of short-circuiting due to dust buildup. This makes it possible to reduce the man-hours required for maintenance.

Moreover, as the solid-insulated busbars 4 are disposed in the busbar chamber 19, the phase-to-phase insulation distance between the solid-insulated busbars 4 can be reduced to decrease a housing space. Further, as the solid-insulated conductors 3A, 3B are used, the insulation distance between the solid-insulated busbars 4 and the solid-insulated conductors 3A, 3B can be reduced. This makes it possible to reduce the overall size of the switchgear. In other words, solid insulation provides better insulation than air insulation and makes it possible to reduce the insulation distance. This will help reduce the overall size of the switchgear. Furthermore, the surfaces of the solid-insulated busbars 4 and solid-insulated conductors 3A, 3B can be covered with conductive rubber placed at ground potential to provide increased assurance of safety for workers.

When the switchgear is used at a high altitude (e.g., at an altitude of 1000 m to 4000 m), poor convective heat dissipation results because the air is thin at a high altitude. Further, the discharge starting voltage decreases in proportion to a decrease in atmospheric pressure, thereby degrading the performance of insulation. This makes it necessary to choose equipment having enhanced dielectric strength. However, the present embodiment places the circuit breaker chamber 17 and the grounding device 5 at a pressure of 1 atmosphere and permits the use of equipment designed for a standard voltage (equipment designed for not higher than 1000 m) even at a high altitude. This eliminates the need for using expensive equipment to provide increased economy.

In addition, as the circuit breaker chamber 17 and the grounding device 5 are pressurized to the predetermined pressure (1 to 5 atmospheres), the insulation distance required for the equipment can be reduced. This makes it possible to use compact equipment whose voltage rating and dielectric strength are lower than required for the switchgear. Consequently, downsizing and increased economy can be achieved.

Moreover, as a cable head 9 and the solid-insulated busbars 4 having a surface ground layer are used, there is no bare charge part except for the vacuum circuit breaker 1. This provides increased safety assurance. Further, increased ease of maintenance is provided because a one-line ground fault makes it possible to conduct an internal arc test on other than the circuit breaker chamber 17 and the vacuum circuit breaker 1 is disposed on the panel front surface.

Consequently, the present embodiment provides small-size, economical switchgear that exhibits high reliability on insulation, reduces the space required for equipment installation and the investment for equipment installation, and eliminates the necessity of adapting the employed equipment to high altitudes even when it is to be used at a high altitude.

EXAMPLE 2

Figure 3:
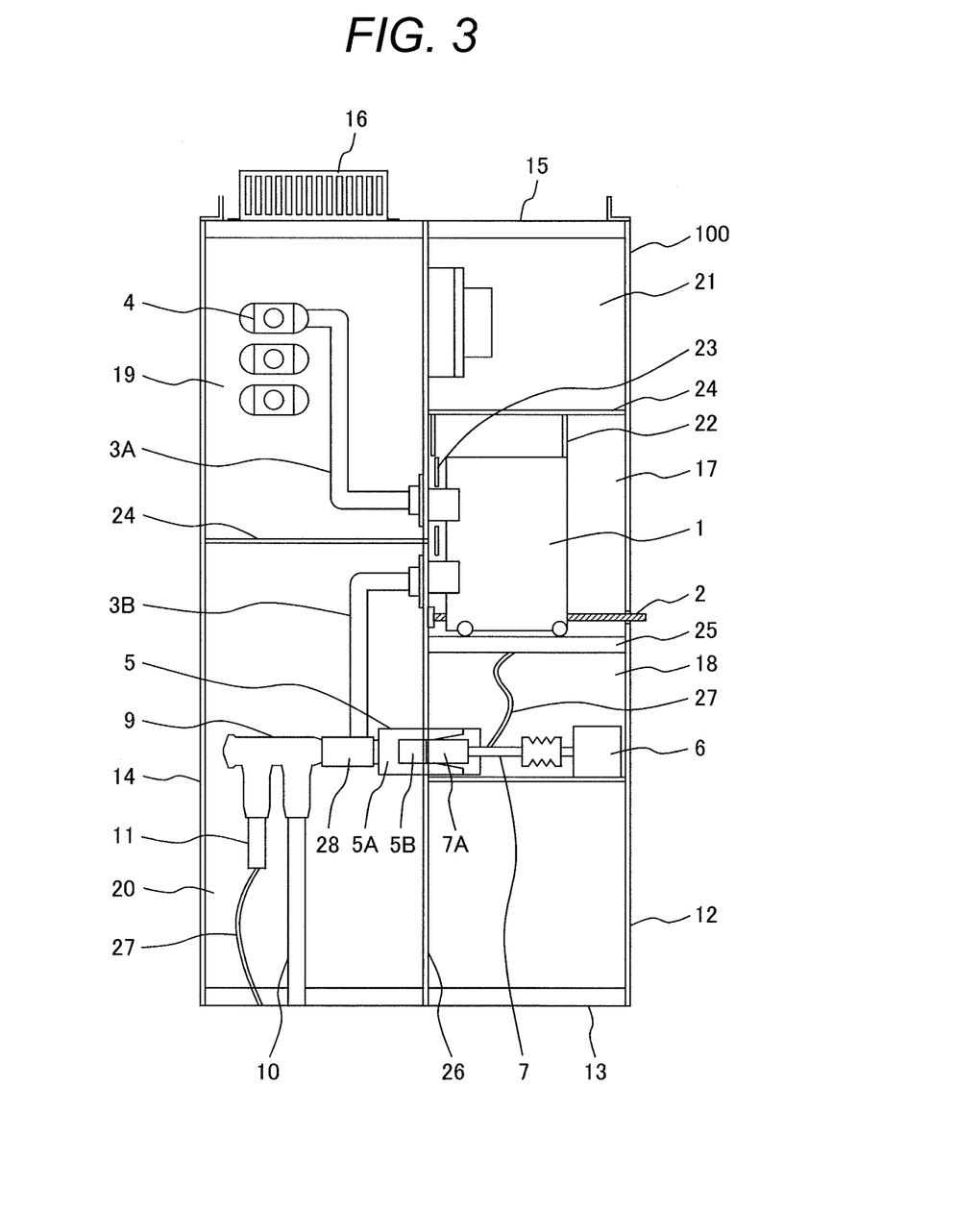
FIG. 3 is a diagram illustrating the configuration of switchgear according to a second embodiment of the present invention.

FIG. 3 shows switchgear according to a second embodiment of the present invention. The switchgear according to the second embodiment, which is shown in FIG. 3, has substantially the same configuration as the switchgear according to the first embodiment, which is shown in FIG. 1. The difference between the first and second embodiments will now be described.

Figure 4:
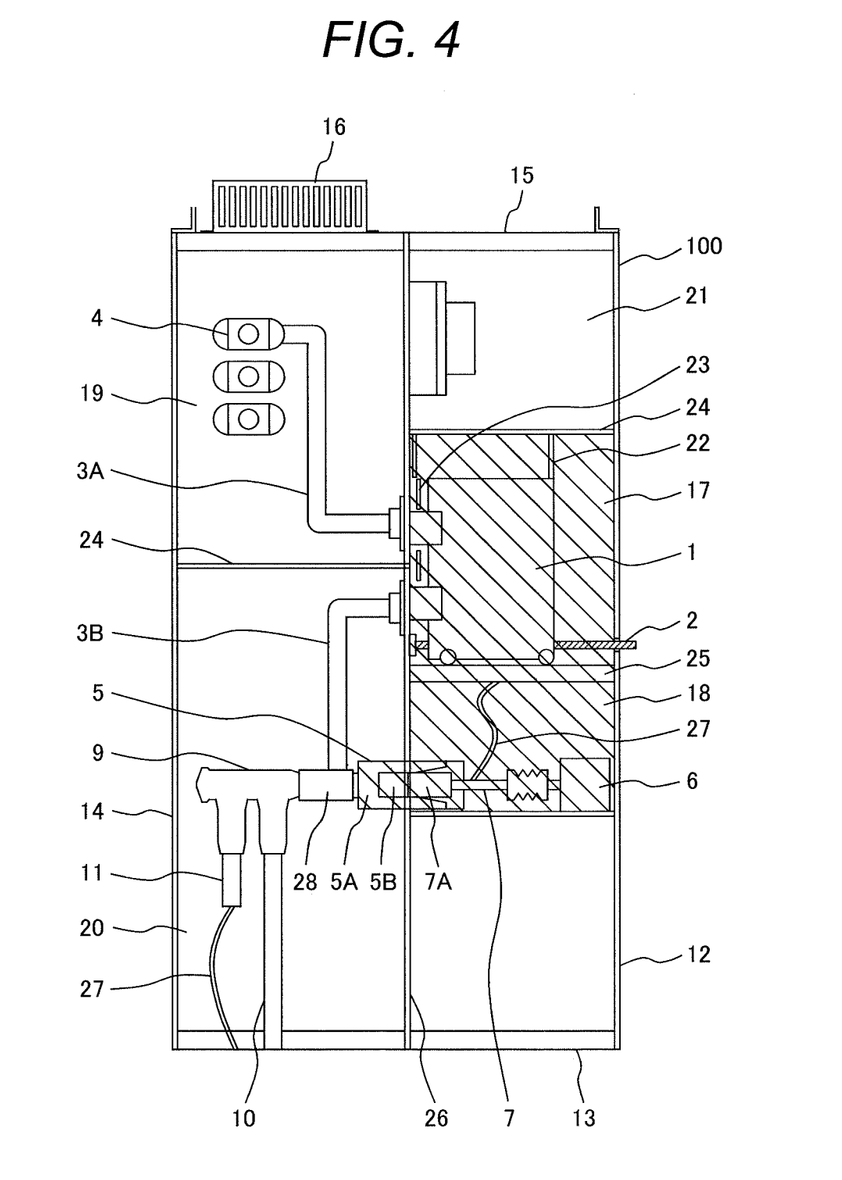
FIG. 4 is a diagram explaining a sealed and/or pressurized area in the switchgear according to the second first embodiment of the present invention.

In the second embodiment, which is shown in FIG. 3, the grounding device 5 is partly positioned in the cable chamber 20 whereas the remaining portion of the grounding device 5 is positioned in the grounding device actuator chamber 18. Further, the grounding device 5 has a sealed structure with the leading end of the U-shaped insulator 5A positioned in the grounding device actuator chamber 18 (a shaded area of FIG. 4). The circuit breaker chamber 17 and the grounding device actuator chamber 18 form a large box-shaped sealed space. This sealed space has the same sealed structure (the shaded area of FIG. 4) as the circuit breaker chamber 17 according to the first embodiment. In addition, the circuit breaker chamber 17, the grounding device 5, and the grounding device actuator chamber 18, which form a large box-shaped sealed space, are pressurized to a predetermined pressure (a pressure of 1 to 5 atmospheres). The reason why the circuit breaker chamber 17, the grounding device 5, and the grounding device actuator chamber 18 are pressurized to a pressure of 1 to 5 atmospheres is the same as described in connection with the first embodiment.

In the second embodiment, the solid-insulated conductor 3B is connected at one end to the vacuum circuit breaker 1 and connected at the other end to a conductive portion 28 connected to the grounding device 5 and the cable 10 through the cable head 9.

The second embodiment, which has the above-described configuration, provides the same advantages as the first embodiment, which has been described earlier.

In the above-described embodiments, the busbar is formed by a solid-insulated busbar while the conductor connecting the vacuum circuit breaker to the busbar and the conductor connecting the vacuum circuit breaker to the grounding device are formed by a solid-insulated conductor. Further, the circuit breaker chamber and the grounding device or the circuit breaker chamber, the grounding device, and the grounding device actuator chamber have a sealed structure. Furthermore, the circuit breaker chamber and the grounding device or the circuit breaker chamber, the grounding device, and the grounding device actuator chamber are pressurized to a predetermined pressure. However, the present invention is not always limited to the above-described embodiments. As far as the busbar is formed by a solid-insulated busbar while the conductor connecting the vacuum circuit breaker to the busbar and the conductor connecting the vacuum circuit breaker to the grounding device are formed by a solid-insulated conductor, and in addition, the circuit breaker chamber and the grounding device or the circuit breaker chamber, the grounding device, and the grounding device actuator chamber have a sealed structure, it is possible not only to achieve high reliability on insulation, but also to reduce the size of the switchgear by reducing the space required for equipment installation and decrease the investment for equipment installation. Meanwhile, as far as the busbar is formed by a solid-insulated busbar while the conductor connecting the vacuum circuit breaker to the busbar and the conductor connecting the vacuum circuit breaker to the grounding device are formed by a solid-insulated conductor, and in addition, the circuit breaker chamber and the grounding device or the circuit breaker chamber, the grounding device, and the grounding device actuator chamber are pressurized to a predetermined pressure, it is possible to provide switchgear that eliminates the necessity of adapting the employed equipment to high altitudes even when it is to be used at a high altitude.

REFERENCE SIGNS LIST

1 ... Vacuum circuit breaker
2 ... Vacuum circuit breaker insertion/extraction rod
3A, 3B ... Solid-insulated conductor
4 ... Solid-insulated busbar
5 ... Grounding device
5A ... Insulator
5B ... Void
6 ... Grounding device actuator
7 ... Insulator operating rod
7A ... Leading end of insulator operating rod
8 ... Sealing cover
9 ... Cable bushing
10 ... Cable
11 ... Arrester
12 ... Panel front surface
13 ... Panel bottom surface
14 ... Panel rear surface
15 ... Panel top surface
16 ... Exhaust port
17 ... Circuit breaker chamber
18 ... Grounding device actuator chamber
19 ... Busbar chamber
20 ... Cable chamber
21 ... Control chamber
22 ... Partition wall
23 ... Shutter
24 ... Partition plate
25 ... Support plate
26 ... Grounded metal plate
27 ... Grounding wire
28 ... Conductive portion
100 ... Housing

The invention claimed is:

1. Switchgear comprising:
a housing that contains a circuit breaker chamber, a busbar chamber, a cable chamber, a grounding device actuator chamber, and a control chamber, which are partitioned by a grounded metal plate;
a vacuum circuit breaker that is disposed in the circuit breaker chamber;
a busbar that is disposed in the busbar chamber and connected to the vacuum circuit breaker through a conductor;
a cable that is disposed in the cable chamber and connected at one end to a load side; and
a grounding device that is operated by a grounding device actuator disposed in the grounding device actuator chamber, connected to the vacuum circuit breaker through a conductor, and connected to the other end of the cable;
wherein the busbar is formed by a solid-insulated busbar;
wherein the conductor connecting the vacuum circuit breaker to the busbar and the conductor connecting the vacuum circuit breaker to the grounding device are both formed by a solid-insulated conductor; and
wherein the circuit breaker chamber and the grounding device have a sealed structure.

2. The switchgear according to claim 1, wherein the sealed structure of the circuit breaker chamber is obtained by sealing a box-shaped body with a seal material; and wherein the sealed structure of the grounding device is obtained by covering a main circuit section of the grounding device with an insulator and sealing the covered main circuit section with a seal material.

3. The switchgear according to claim 1, wherein the circuit breaker chamber and the grounding device are pressurized to a predetermined pressure.

4. The switchgear according to claim 3, wherein the circuit breaker chamber and the grounding device are pressurized to a pressure of 1 to 5 atmospheres.

5. The switchgear according to claim 1, wherein, from top to bottom, the control chamber, the circuit breaker chamber, and the grounding device actuator chamber are disposed on the front side of the housing; and wherein, from top to bottom, the busbar chamber and the cable chamber are disposed on the rear side of the housing.

6. The switchgear according to claim 1, wherein the grounding device is disposed in the cable chamber.

7. The switchgear according to claim 1, wherein the grounding device is partly positioned in the cable chamber while the remaining portion of the grounding device is positioned in the grounding device actuator chamber.

8. The switchgear according to claim 1, wherein the vacuum circuit breaker in the circuit breaker chamber is capable of not only being moved, but also being inserted into and extracted from the circuit breaker chamber by a vacuum circuit breaker insertion/extraction rod.

9. Switchgear comprising:
a housing that contains a circuit breaker chamber, a busbar chamber, a cable chamber, a grounding device actuator chamber, and a control chamber, which are partitioned by a grounded metal plate;
a vacuum circuit breaker that is disposed in the circuit breaker chamber;
a busbar that is disposed in the busbar chamber and connected to the vacuum circuit breaker through a conductor;
a cable that is disposed in the cable chamber and connected at one end to a load side; and
a grounding device that is operated by a grounding device actuator disposed in the grounding device actuator chamber, connected to the vacuum circuit breaker through a conductor, and connected to the other end of the cable;
wherein the busbar is formed by a solid-insulated busbar;
wherein the conductor connecting the vacuum circuit breaker to the busbar and the conductor connecting the vacuum circuit breaker to the grounding device are both formed by a solid-insulated conductor; and
wherein at least the circuit breaker chamber and the grounding device are pressurized to a predetermined pressure.

10. The switchgear according to claim 9, wherein the circuit breaker chamber and the grounding device are pressurized to a pressure of 1 to 5 atmospheres.

11. The switchgear according to claim 9, wherein, from top to bottom, the control chamber, the circuit breaker chamber, and the grounding device actuator chamber are disposed on the front side of the housing; and wherein, from top to bottom, the busbar chamber and the cable chamber are disposed on the rear side of the housing.

12. The switchgear according to claim 9, wherein the grounding device is disposed in the cable chamber.

13. The switchgear according to claim 9, wherein the grounding device is partly positioned in the cable chamber while the remaining portion of the grounding device is positioned in the grounding device actuator chamber.

14. The switchgear according to claim 13, wherein the circuit breaker chamber, the grounding device, and the grounding device actuator chamber are pressurized to a predetermined pressure.

15. The switchgear according to claim 14, wherein the circuit breaker chamber, the grounding device, and the grounding device actuator chamber are pressurized to a pressure of 1 to 5 atmospheres.

* * * * *